(No Model.)
C. R. McGAHEY.
CHURN.
No. 543,537. Patented July 30, 1895.
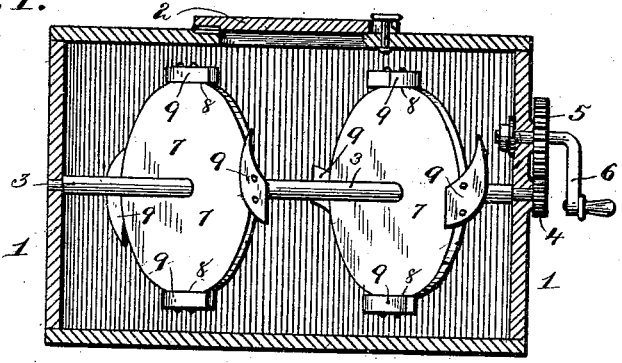
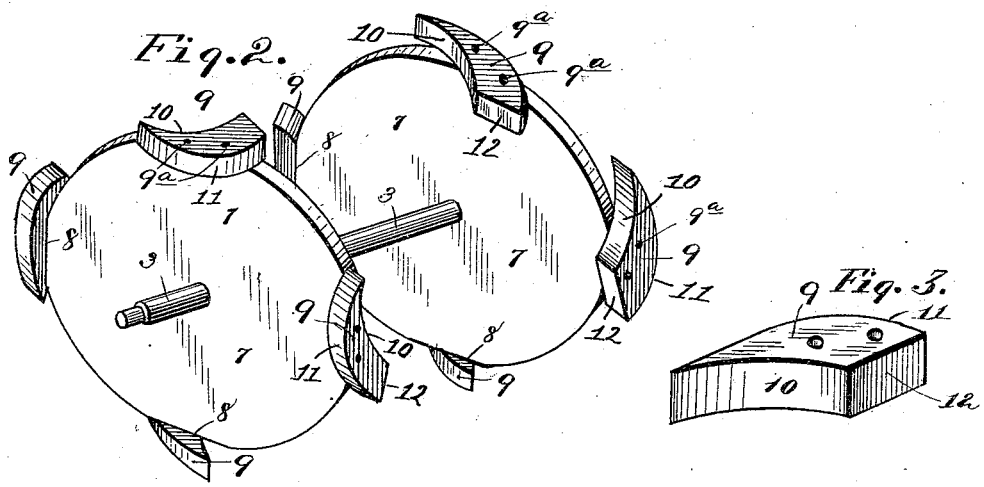
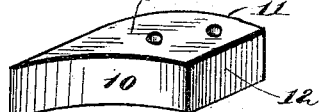
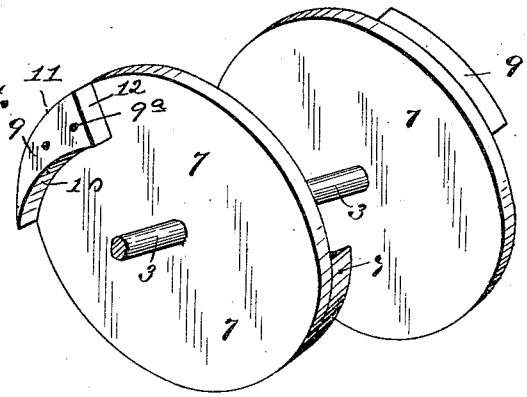
Witnesses
Inventor
Calvert R. McGahey
By his Attorneys.
C. A. Snow & Co.

UNITED STATES PATENT OFFICE.

CALVERT R. McGAHEY, OF ELKTON, VIRGINIA.

CHURN.

SPECIFICATION forming part of Letters Patent No. 543,537, dated July 30, 1895.

Application filed June 5, 1894. Serial No. 513,514. (No model.)

*To all whom it may concern:*

Be it known that I, CALVERT R. McGAHEY, a citizen of the United States, residing at Elkton, in the county of Rockingham and State of Virginia, have invented a new and useful Churn, of which the following is a specification.

The invention relates to an improvement in that class of churns which are provided with horizontal dashers, and it has for its object the production of a device which will be capable of engaging the cream with an endwise stroke in addition to the side stroke. This end I attain by means of a series of diagonal disks provided with peculiarly-shaped dashers.

In the accompanying drawings, Figure 1 represents a longitudinal section of a churn supplied with my improvements; Fig. 2, an enlarged perspective of the dasher-shaft with the affixed dashers, showing them dissociated from the churn-body; Fig. 3, a detail perspective of one of the dasher-heads; Fig. 4, a detail perspective of a modification.

The reference-numeral 1 indicates the body of the churn, which may be of any preferred form, but which is preferably rectangular, and which is provided with a removable lid 2, whereby it may be closed.

3 indicates the dasher-shaft, which extends horizontally and longitudinally through the body 1, and which has one of its ends extended beyond the body and provided with a pinion-gear 4, which meshes with a spur-gear 5, fixed to the outer side of the body. The spur-gear 5 is provided with a crank 6, whereby motion may be imparted thereto and transmitted to the shaft 3.

7 indicates the diagonally-arranged imperforate disks of prior mention, and these are preferably two in number and fixed to the shaft 3, so as to revolve therewith. The disks 7 are arranged parallel with each other and diagonally with the shaft 3, so that as they revolve therewith they will impart to the cream a compound movement, as will be understood.

Formed on the peripheries of the disks 7 are the plane portions 8, which are preferably four for each disk, and which are arranged equidistant throughout the periphery thereof.

9 indicates the curved or segmental dashers proper, or dasher-heads, which are fixed to the peripheries of the disks 7 by means of the bolts $9^a$ passing through them and into the disks. The dasher-heads are one for each plane portion 8, and are mounted thereon, so that the dasher-heads will lie parallel with the shaft and with the top and bottom of the body portion 1. The shape of the dasher-heads 9 is shown in Fig. 3, and there it will be seen that the dasher-heads are formed with curved inner sides 10 and with curved outer sides 11. The outer sides 11 are convex in form and extend around to the plane occupied by the inner ends of the sides 10, the two sides being joined by a plane side 12. This construction will give the dasher-heads the form of a horn or cornucopia. These dashers are arranged with their points in alignment with the peripheries of their respective disks, and are adapted to engage with the cream as the disks revolve, and to have their concave sides 10 throw the cream inwardly and toward the companion disk and dasher-heads. By means of this arrangement the most effective agitation of the cream is secured. The cream is thrown endwise by reason of the diagonal disposition of the disks, and sidewise and inwardly by reason of the dasher-heads 9 and their peculiar construction.

The modification of Fig. 4 differs from the preferred form in that the dasher-heads 9 are fixed to the sides of the disks 7 and directly adjacent to their peripheries at diametrically-opposite points, so that the outer faces 11 will conform with the curvature of the peripheries of the disks and will lie immediately adjacent thereto. By this arrangement the operation of the churn is made very similar to the operation attending the preferred form and by the same means.

In the operation of the invention the body portion 1 is filled with the cream to be transformed into butter and the lid 2 closed, after which the shaft 3 is set to revolving. As the shaft revolves the disks 7 revolve with it and through the cream in the body portion, which will result in the throwing of the cream endwise or longitudinally with the shaft 3. Simultaneously with this operation the dasher-heads will engage the cream and throw it sidewise or at right angles to the shaft 3, thus imparting to it a compound movement which greatly accelerates the operation of churning.

Having described my invention, what I claim is—

1. A churn dasher comprising a shaft, and imperforate parallel disks arranged obliquely on said shaft and carrying dashers or dasher heads, substantially as set forth.

2. A churn dasher comprising a horizontal shaft, parallel disks arranged obliquely or diagonally on said shaft, and segmental dashers or dasher heads arranged on diametrically opposite sides of said disks, substantially as set forth.

3. A churn dasher comprising a horizontal shaft, parallel imperforate disks arranged obliquely or diagonally on said shaft, and segmental dashers or dasher heads arranged on diametrically opposite sides of said disks, said dashers or dasher heads being located directly adjacent to the peripheries of said disks to dispose the outer curve faces thereof flush with the said peripheries of the disks, substantially as specified.

In testimony that I claim the foregoing as my own I have hereto affixed my signature in the presence of two witnesses.

CALVERT R. McGAHEY.

Witnesses:
JOHN H. SIGGERS,
I. B. OWENS.